(12) United States Patent
Shteingart et al.

(10) Patent No.: US 12,265,445 B2
(45) Date of Patent: Apr. 1, 2025

(54) DETECTION AND MITIGATION OF MALFUNCTIONING COMPONENTS IN A CLUSTER COMPUTING ENVIRONMENT

(71) Applicant: Dell Products L.P., Round Rock, TX (US)

(72) Inventors: Alexander Shteingart, Nahariya (IL); Shoham Levy, Ra'anana (IL); Alexander Zvansky, Haifa (IL)

(73) Assignee: Dell Products L.P., Round Rock, TX (US)

( * ) Notice: Subject to any disclaimer, the term of this patent is extended or adjusted under 35 U.S.C. 154(b) by 1 day.

(21) Appl. No.: 18/118,195

(22) Filed: Mar. 7, 2023

(65) Prior Publication Data

US 2024/0303146 A1 Sep. 12, 2024

(51) Int. Cl.
  *G06F 11/00* (2006.01)
  *G06F 11/07* (2006.01)
  *G06F 11/16* (2006.01)

(52) U.S. Cl.
  CPC ...... *G06F 11/0772* (2013.01); *G06F 11/1658* (2013.01)

(58) Field of Classification Search
  None
  See application file for complete search history.

(56) References Cited

U.S. PATENT DOCUMENTS

| | | | |
|---|---|---|---|
| 2013/0227144 A1* | 8/2013 | Saito | H04L 47/70 709/226 |
| 2018/0287801 A1* | 10/2018 | Donlan | G06F 21/78 |
| 2020/0336387 A1* | 10/2020 | Suzuki | H04L 41/147 |

OTHER PUBLICATIONS

Google Scholar/Patents search—text refined (Year: 2024).*
Stevens, Simon; "Resiliency Explained—Understanding the PowerFlex Self-Healing, Self-Balancing Architecture;" Home Integrated Products PowerFlex Blogs; https://infohub.delltechnologies.com/p/resiliency-explained-understanding-the-powerflex-self-healing-self-balancing-architecture/; Aug. 17, 2020.

(Continued)

*Primary Examiner* — Christopher S McCarthy
(74) *Attorney, Agent, or Firm* — Ryan, Mason & Lewis, LLP (57) ABSTRACT

Techniques are provided for detection and mitigation of malfunctioning components in a cluster computing environment. One method comprises obtaining, by a virtual infrastructure monitor, from a cluster monitor, an indication of a malfunctioning component in a cluster computing environment; selecting a virtual infrastructure server type for a replacement virtual infrastructure server based on a type of the malfunctioning component; creating a replacement virtual infrastructure server based on the selected virtual infrastructure server type and properties of a virtual infrastructure server associated with the malfunctioning component; applying settings to the replacement virtual infrastructure server according to rules for the replacement virtual infrastructure server; deploying a replacement component on the replacement virtual infrastructure server; and providing a notification to the cluster monitor of the replacement component and credentials of the replacement component. The cluster monitor may add the replacement component to the cluster computing environment responsive to the notification.

20 Claims, 7 Drawing Sheets

(56) References Cited

OTHER PUBLICATIONS

Castagna, Rich; "Software-defined Storage Products Don't Negate Hardware's Importance;" TechTarget Storage; https://www.techtarget.com/searchstorage/opinion/Software-defined-storage-products-dont-negate-hardwares-importance; Aug. 2, 2017.
"Self-Healing Storage—Fail-Safe Storage and Heal-in-Time;" https://www.msystechnologies.com/resource/articles/self-healing-storage-fail-safe-storage-and-heal-in-time/; downloaded Feb. 27, 2023.
"Getting to Know Dell EMC PowerFlex v.3.5"; Jan. 2021.
U.S. Appl. No. 18/090,792 entitled, "Cluster Management in Large-Scale Storage Systems;" filed Dec. 29, 2022.

* cited by examiner

FIG. 1

- CLUSTER MONITOR PERIODICALLY POLLS CLUSTER COMPUTING ENVIRONMENT FOR HEALTH SCORE;
- CLUSTER MONITOR EVALUATES HEALTH SCORE, USING PREDEFINED POLICIES, IDENTIFIES A MALFUNCTIONING CLUSTER COMPONENT AND NOTIFIES VIRTUAL INFRASTRUCTURE MONITOR TO PROVISION A REPLACEMENT VIRTUAL MACHINE WITH SPECIFIED PROPERTIES;
- CLUSTER MONITOR REMOVES MALFUNCTIONING CLUSTER COMPONENT USING A REMOVAL PROCEDURE FOR MALFUNCTIONING CLUSTER COMPONENT;
- VIRTUAL INFRASTRUCTURE MONITOR IDENTIFIES AND RELEASES THE VIRTUAL MACHINE ASSOCIATED WITH THE MALFUNCTIONING CLUSTER COMPONENT;
- VIRTUAL INFRASTRUCTURE MONITOR SELECTS A NEW VIRTUAL MACHINE TYPE FOR THE REPLACEMENT VIRTUAL MACHINE BASED ON A TYPE OF THE MALFUNCTIONING CLUSTER COMPONENT;
- VIRTUAL INFRASTRUCTURE MONITOR CREATES A NEW VIRTUAL MACHINE ACCORDING TO THE SELECTED VIRTUAL MACHINE TYPE AND THE REGION/AVAILABILITY ZONE OF THE REPLACED NODE;
- VIRTUAL INFRASTRUCTURE MONITOR APPLIES NETWORK AND SECURITY SETTINGS TO THE NEW VIRTUAL MACHINE ACCORDING TO PREREQUISITES FOR THE NEW VIRTUAL MACHINE;
- VIRTUAL INFRASTRUCTURE MONITOR DEPLOYS THE REPLACEMENT CLUSTER COMPONENT ON THE NEW VIRTUAL MACHINE;
- VIRTUAL INFRASTRUCTURE MONITOR INFORMS THE CLUSTER MONITOR ABOUT THE NEW VIRTUAL MACHINE AND ITS CREDENTIALS;
- CLUSTER MONITOR ADDS THE REPLACEMENT CLUSTER COMPONENT TO THE CLUSTER COMPUTING ENVIRONMENT AND VALIDATES PROPER DATA/ROLES SYNCHRONIZATION (RETRYING OPERATION IF NEEDED);
- IF THE REPLACEMENT CLUSTER COMPONENT CANNOT BE ADDED, VIRTUAL INFRASTRUCTURE MONITOR IS CALLED FOR REPLACEMENT OF SERVER ASSOCIATED WITH MALFUNCTIONING CLUSTER COMPONENT; AND
- JOURNAL MODULE RECORDS ALL FLOW COMMANDS IN THE JOURNAL AND CALLS THE REPORTING MODULE.

DETECTION AND MITIGATION OF MALFUNCTIONING COMPONENTS IN A CLUSTER COMPUTING ENVIRONMENT

FIELD

The field relates generally to information processing systems, and more particularly to storage in such systems.

BACKGROUND

The amount of data that must be stored and managed, for example, in datacenters and cloud-based storage systems, continues to increase. To meet such data storage demands, datacenters and cloud-based storage systems increasingly use a software-defined storage platform that provides significant flexibility, enhanced storage performance and scalability for the data storage environment. Software-defined storage systems increasingly employ cloud-based infrastructure. Cloud-based infrastructure, however, often has planned maintenance downtimes and other limitations that can significantly impair the performance of cloud-based storage systems.

SUMMARY

In one embodiment, a method comprises obtaining, by a processor-based virtual infrastructure monitoring entity, from a processor-based cluster monitoring entity associated with a cluster computing environment, an indication of a malfunctioning component in the cluster computing environment; selecting a virtual infrastructure server type for a replacement virtual infrastructure server based at least in part on a type of the malfunctioning component; creating a replacement virtual infrastructure server based at least in part on the selected virtual infrastructure server type and one or more properties of a virtual infrastructure server associated with the malfunctioning component; applying one or more settings to the replacement virtual infrastructure server according to one or more rules for the replacement virtual infrastructure server; deploying a replacement component on the replacement virtual infrastructure server; and providing a notification to the processor-based cluster monitoring entity of the replacement component and one or more credentials of the replacement component, wherein the processor-based cluster monitoring entity adds the replacement component to the cluster computing environment responsive to the notification.

In one or more embodiments, the processor-based cluster monitoring entity may detect the malfunction associated with the malfunctioning component in the cluster computing environment by evaluating one or more of health scores and notifications for the cluster computing environment using a policy. The processor-based cluster monitoring entity may remove the malfunctioning component from a cluster using a removal procedure designated for the malfunctioning component. The processor-based cluster monitoring entity may reduce a size of the cluster comprising the malfunctioning component before performing the removing of the malfunctioning component from the cluster. The adding of the replacement component to the cluster computing environment by the processor-based cluster monitoring entity may comprise validating an operation of the replacement component and/or restoring, following the deployment of the replacement component, the cluster to an original size.

In some embodiments, the virtual infrastructure monitoring agent may release the virtual infrastructure server associated with the malfunctioning component. The virtual infrastructure monitoring agent may replace the replacement virtual infrastructure server in response to the replacement component not being added. In at least one embodiment, (i) information associated with one or more processing steps of the method may be recorded in a journal; and/or (ii) at least one notification may be generated based at least in part on information associated with one or more processing steps of the method in a journal. The creating the replacement virtual infrastructure server may employ topology information related to one or more of the cluster computing environment and a virtual infrastructure environment.

Other illustrative embodiments include, without limitation, apparatus, systems, methods and computer program products comprising processor-readable storage media.

BRIEF DESCRIPTION OF THE DRAWINGS

FIG. 2 is a process diagram illustrating an exemplary implementation of a component malfunction mitigation process in accordance with an illustrative embodiment;

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for detection and mitigation of malfunctioning components in a cluster computing environment.

One or more aspects of the disclosure recognize that automated tools offered by cloud orchestrators to address virtual machine and network problems are stateless and are thus not suitable for software-defined storage platforms. Even if automated tools were employed to restore such virtual infrastructure, the storage system often remains degraded or inoperable without human intervention.

In one or more embodiments, self-healing techniques are provided for detection and mitigation of malfunctioning components in a cluster computing environment. In at least some embodiments, the disclosed cluster component malfunction mitigation techniques provide an automated mechanism for malfunction mitigation and may provide cost savings for the user for unused resources.

In some embodiments, the disclosed malfunction mitigation techniques provide a mechanism for automated recovery and self-healing with respect to stateful software-defined storage components. For example, if a virtual infrastructure component fails or becomes disconnected, the disclosed techniques can be employed to recreate a new server with the appropriate specifications and to employ designated procedures for adding stateful virtual infrastructure components to a storage cluster.

In one or more embodiments, the disclosed techniques for detection and mitigation of malfunctioning components in a cluster computing environment access: (i) cloud management application programming interfaces (APIs) and notifications; (ii) the operating systems of the virtual machines that host the virtual infrastructure components; and (iii) topology information related to: (a) the cluster computing environment and (b) a virtual infrastructure environment that implements at least portions of the cluster computing environment. For example, the topology information for the cluster computing environment may comprise node prototypes, distribution of software modules, and network configuration information. In addition, the topology information for the virtual infrastructure environment may comprise, for example, region and availability zone information of the virtual infrastructure environment.

Figure 1:
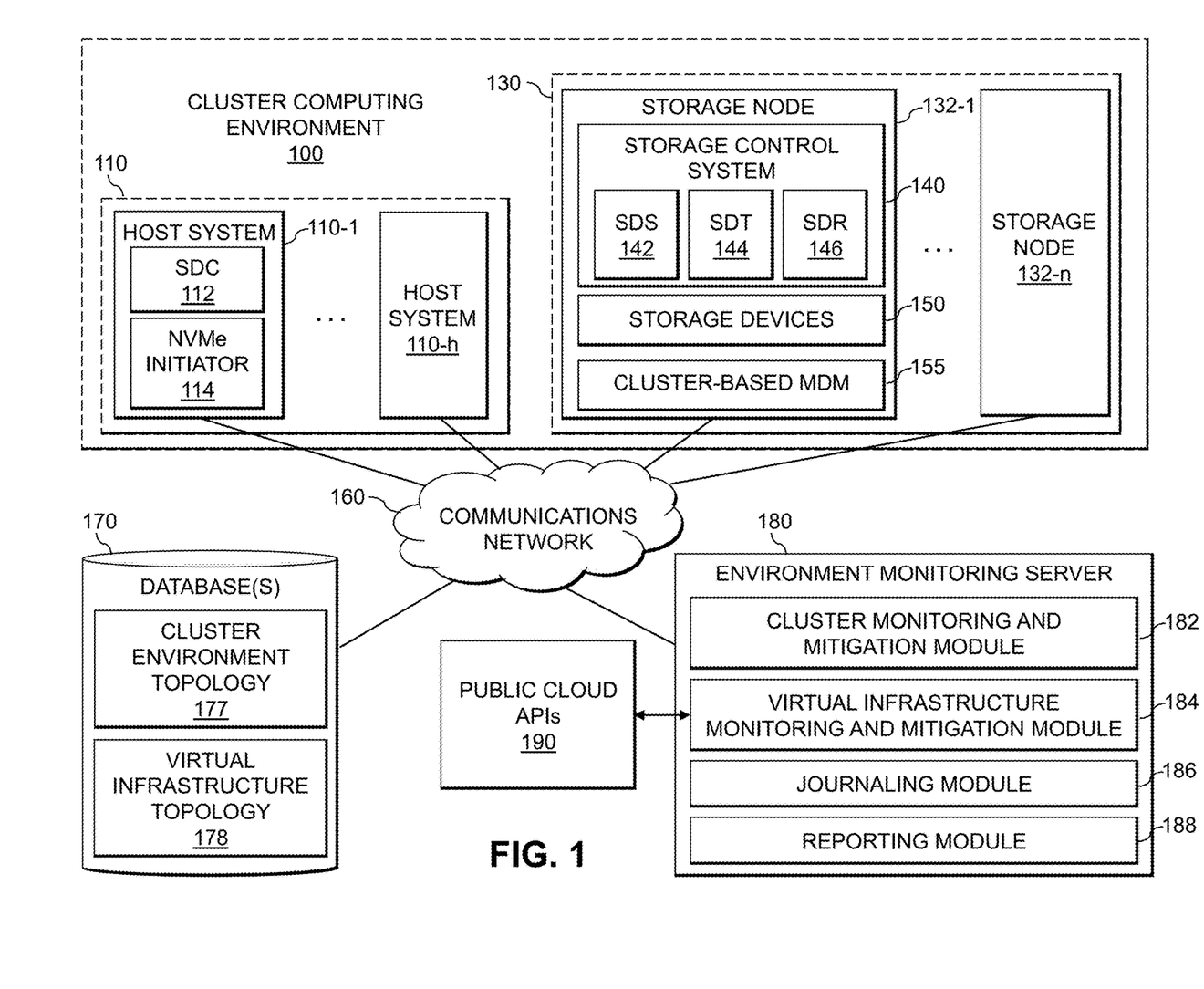
FIG. 1 illustrates a network computing environment comprising a data storage system that can be configured for detection and mitigation of malfunctioning components in a cluster computing environment in accordance with an illustrative embodiment.

FIG. 1 schematically illustrates a network computing environment comprising a data storage system that can be configured for detection and mitigation of malfunctioning components in a cluster computing environment, according to an exemplary embodiment of the disclosure. In particular, FIG. 1 schematically illustrates a cluster computing environment 100 that comprises one or more host systems 110-1 . . . 110-$h$ (collectively, host systems 110), a communications network 160, a data storage system 130 comprising a cluster of storage nodes 132-1 . . . 132-$n$ (collectively, storage nodes 132).

In some embodiments, each host system 110-1 . . . 110-$h$ comprises a storage data client (SDC) 112 and a non-volatile memory express (NVMe) initiator 114 (or NVMe initiator 114), the functions of which will be explained below.

As further shown in FIG. 1, the storage node 132-1 comprises a storage control system 140, storage devices 150 and a cluster-based metadata manager (MDM) 155. In some embodiments, the storage control system 140 is a software-defined storage control system that comprises a storage data server (SDS) 142, a storage data target (SDT) 144 and a storage data replicator (SDR) 146, the functions of which will be explained below. In some embodiments, the other storage nodes (e.g., storage node 132-$n$) have the same or similar configuration as the storage node 132-1 shown in FIG. 1.

The host systems 110 comprise physical server nodes and/or virtual server nodes (e.g., compute nodes) that host and execute applications that are configured to process data and execute tasks/workloads and perform computational work, either individually, or in a distributed manner, to thereby provide compute services to one or more users (the term "user" herein is intended to be broadly construed so as to encompass numerous arrangements of human, hardware, software or firmware entities, as well as combinations of such entities). In some embodiments, the host systems 110 comprise application servers, database servers, etc. The host systems 110 can include virtual nodes such as virtual machines and container systems. In some embodiments, the host systems 110 comprise a cluster of computing nodes of an enterprise computing system, a cloud-based computing system, or other types of computing systems or information processing systems comprising multiple computing nodes associated with respective users. The host systems 110 issue data access requests to the data storage system 130, wherein the data access requests include (i) write requests to store data in one or more of the storage nodes 132 and (ii) read requests to access data that is stored in one or more of the storage nodes 132.

The communications network 160 is configured to enable communication between the host systems 110 and the storage nodes 132, as well as peer-to-peer communications between the storage nodes 132. Also coupled to communications network 160 in the example of FIG. 1 are one or more databases 170 and one or more environment monitoring servers 180. In this regard, while the communications network 160 is generically depicted in FIG. 1, it is to be understood that the communications network 160 may comprise any known communication network such as, a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., IP-based or Fiber Channel storage fabric), or various portions or combinations of these and other types of networks. In this regard, the term "network" as used herein is therefore intended to be broadly construed so as to encompass a wide variety of different network arrangements, including combinations of multiple networks possibly of different types, that enable communication using, e.g., Transfer Control Protocol/Internet Protocol (TCP/IP) or other communication protocols such as Fibre Channel (FC), FC over Ethernet (FCoE), RDMA over Converged Ethernet (RoCE), Internet Small Computer System Interface (iSCSI), Peripheral Component Interconnect express (PCIe), InfiniBand, Gigabit Ethernet, etc., to implement I/O channels and support storage network connectivity. Numerous alternative networking arrangements are possible in a given embodiment, as will be appreciated by those skilled in the art.

In some embodiments, each storage node 132 comprises a server node (e.g., storage-only node) that is implemented on, e.g., a physical server machine or storage appliance comprising hardware processors, system memory, and other hardware resources that execute software and firmware to implement the functionality of the storage node 132 and the associated storage control system 140. In some embodiments, each storage node 132 comprises a plurality of control processors that execute a lightweight operating system (e.g., a customized lightweight Linux kernel) and functional software (e.g., software-defined storage software) to implement functions of the storage control system 140, as discussed in further detail below.

The storage devices 150 of a given storage node 132 can be internal storage devices and/or direct-attached storage devices, and may comprise one or more of various types of storage devices such as hard-disk drives (HDDs), solid-state drives (SSDs), flash memory cards (e.g., PCIe cards), or other types of non-volatile memory (NVM) devices including, but not limited to, non-volatile random-access memory (NVRAM), phase-change RAM (PC-RAM), magnetic RAM (MRAM), and other types of storage media, etc. In some embodiments, the storage devices 150 comprise flash memory devices such as NAND flash memory, NOR flash memory, etc. The NAND flash memory can include single-level cell (SLC) devices, multi-level cell (MLC) devices, triple-level cell (TLC) devices, or quad-level cell (QLC) devices. These and various combinations of multiple different types of storage devices 150 may be implemented on each storage node 132. In this regard, the term "storage device" as used herein should be broadly construed to encompass all types of persistent storage media including hybrid drives. On a given storage node 132, the storage control system 140 is configured to communicate with the storage devices 150 through any suitable host interface, e.g., a host bus adapter, using suitable protocols such as Advanced Technology Attachment (ATA), serial ATA (SATA), external SATA (eSATA), parallel ATA (PATA), non-volatile memory express (NVMe), small computer system interface (SCSI), serial attached SCSI (SAS), peripheral component interconnect express (PCIe), etc.

The data storage system 130 may comprise any type of data storage system, or a combination of data storage systems, including, but not limited to, a storage area network (SAN) system, a dynamic scale-out data storage system, or other types of distributed data storage systems comprising software-defined storage, clustered or distributed virtual and/or physical infrastructure. The term "data storage system" as used herein should be broadly construed and not viewed as being limited to storage systems of any particular type or types. In some embodiments, the data storage system 130 comprises a dynamic scale-out storage system that allows additional storage nodes to be added (or removed) to the cluster to scale the performance and storage capacity of the data storage system 130. It is to be noted that each storage node 132 and associated storage devices 150 is an example of what is more generally referred to herein as a "storage system" or a "storage array."

In some embodiments, the data storage system 130 comprises a dynamic scale-out software-defined storage system that is configured to implement a high-capacity block-level SAN storage system (e.g., virtual SAN system) that consolidates the capacity of the storage devices 150 (e.g., HDDs, SSDs, NVMe flash storage, flash PCIe cards etc.) of the storage nodes 132 into shared block storage that is logically partitioned into logical storage volumes identified by, e.g., logical unit numbers (LUNs). In an exemplary embodiment of a scale-out software-defined SAN storage system, the storage control systems 140 comprise software components of a software-defined storage system, that are executed on the storage nodes 132 to implement a software-defined storage environment in which the storage nodes 132 form a loosely coupled storage server cluster and collectively communicate and operate to create a server-based SAN system (e.g., virtual SAN) to provide host access to a virtual pool of block storage using the combined storage capacity (e.g., storage devices 150) of the storage nodes 132.

In some embodiments, the SDCs 112, the cluster-based MDMs 155, the SDSs 142, the SDTs 144, and the SDRs 146 comprise software components of a software-defined storage platform, wherein the software components are installed on physical server machines (or server nodes) such as application servers, storage servers, control servers, etc. In some embodiments, virtual machines (e.g., Linux-based virtual machines) are utilized to host the software components of the software-defined storage platform. The software components collectively implement various functions for deploying and managing a software-defined, scale-out server SAN architecture that can grow from a few servers to thousands of severs.

For example, the SDS 142 comprises a service that is configured to manage the storage capacity (e.g., storage devices 150) of a single server (e.g., storage node 132) and provide back-end access to the storage devices of the server. In other words, the SDS 142 is installed on each server that contributes some or all of the capacity of its local storage devices to the scale-out data storage system. More specifically, in the scale-out software-defined storage environment, the SDSs 142 of the storage control systems 140 are configured to create and manage storage pools (e.g., virtual pools of block storage) by aggregating storage capacity of the respective storage devices 150 and dividing each storage pool into one or more volumes, wherein the volumes are exposed to the SDCs 112 of the host systems 110 as virtual block devices. For example, a virtual block device can correspond to a volume of a storage pool. Each virtual block device comprises any number of actual physical storage devices, wherein each virtual block device is preferably homogenous in terms of the type of storage devices that make up the block device (e.g., a block device can include only HDD devices or SSD devices, etc.). In this regard, each instance of the SDS 142 that runs on a respective one of the storage nodes 132 contributes some or all of its local storage space to an aggregated virtual pool of block storage with varying performance tiers (e.g., HDD, SSD, etc.) within a virtual SAN.

In some embodiments, each SDC 112 that executes on a given host system 110 comprises a lightweight block device driver that is deployed to expose shared block volumes to the host systems 110. In particular, each SDC 112 is configured to expose the storage volumes as block devices to the applications located on the same server (e.g., application server) on which the SDC 112 is installed. In other words, as shown in FIG. 1, the SDCs 112 run on the same server machines as the host systems 110 that require access to the block devices exposed and managed by the SDSs 142 of the storage nodes 132. The SDC 112 of a given host system 110 exposes block devices representing the virtual storage volumes that are currently mapped to the given host system 110. In particular, the SDC 112 for a given host system 110 serves as a block driver for the host system 110, wherein the SDC 112 intercepts I/O requests, and utilizes the intercepted I/O request to access the block storage that is managed by the SDSs 142. The SDCs 112 are installed in the operating system or hypervisor hosting the application layer and provide the operating system or hypervisor (that runs the SDC 112) access to the logical block devices (e.g., volumes). The SDCs 112 have knowledge of which SDSs 142 hold its block data, so multipathing can be accomplished natively through the SDCs 112, where the communications network 160 is configured to provide an any-to-any connection between the host systems 110 and the storage nodes 132. More specifically, each SDC 112 connects to every SDS 142, that eliminates the need for multipath software, in at least some embodiments.

In some embodiments, the cluster-based MDM 155 implements a management layer on one or more of the storage nodes 132 that manages and configures the software-defined storage system in the cluster computing environment 100. The cluster-based MDM 155 is a service that functions as a monitoring and configuration agent of the storage environment. More specifically, in some embodiments, the management layer is configured to supervise the operations of the storage cluster and manage storage cluster configurations. For example, the cluster-based MDMs 155 (or MDM cluster) manage the storage system by aggregating the entire storage exposed to the MDM cluster by the SDSs 142 to generate a virtual storage layer (e.g., virtual SAN storage layer), wherein logical volumes can be defined over storage pools and exposed to host applications as a local storage device using the SDCs 112.

For additional details regarding exemplary implementations of cluster-based MDMs 155, as well as representative 3-node and 5-node MDM clusters, see, for example, U.S. patent application Ser. No. 18/090,792, filed Dec. 29, 2022, entitled "Cluster Management in Large-Scale Storage Systems," incorporated by reference herein in its entirety.

Further, the cluster-based MDMs 155 are configured to manage various types of metadata associated with the software-defined storage system. For example, such metadata includes a mapping of the SDCs 112 to the SDSs 142 of the storage nodes 132, wherein such mapping information is provided to the SDCs 112 and the SDSs 142 to allow such components to control input/output (I/O) data path operations (e.g., allow the SDCs 112 to communicate with target SDSs 142 to access data in logical volumes that are mapped to the SDCs 112). In addition, the cluster-based MDMs 155 collect connectivity status updates from the SDCs 112 to monitor all connections between SDCs 112 and the SDSs 142 to determine the current system state, and posts events whenever a given SDC 112 connects to or disconnects from a specific IP address of a given SDS 142.

In addition, the cluster-based MDMs 155 are configured to manage various management operations such as data migration, rebuilds, and other system-related functions. In this regard, the cluster-based MDMs 155 generate and manage various types of metadata that are required to perform various management operations in the storage environment such as, e.g., performing data migration operations, performing rebalancing operations, managing configuration changes, managing the SDCs 112 and the SDSs 142, maintaining and updating device mappings, maintaining management metadata for controlling data protection operations such as snapshots, replication, RAID configurations, etc., managing system capacity including storage device allocations and/or release of capacity, performing operations for recovery from errors and failures, and system rebuild tasks, etc. The cluster-based MDMs 155 communicate with the SDCs 112 to provide notification of changes in data layout, and communicate with the SDSs 142 to coordinate rebalancing operations. In some embodiments, the cluster-based MDMs 155 are configured to implement a distributed cluster management system.

In some embodiments, the software-defined storage system utilizes various logical entities that link the physical layer to the virtual storage layer, wherein such logical entities include protection domains, fault sets, and storage pools. In some embodiments, a protection domain is a logical entity that comprises a group of SDSs 142 that provide backup for each other. Each SDS 142 belongs to only one protection domain such that each protection domain comprises a unique set of SDSs 142. In some embodiments, each protection domain can have up to a maximum number of SDS nodes (e.g., 128 SDS nodes). The use of protection domains enables optimal performance, reduction of mean time between failure (MTF) issues, and the ability to sustain multiple failures in different protection domains.

Further, in some embodiments, a fault set is a logical entity that defines a logical group of SDS nodes (within a protection domain) that are more inclined to fail together, e.g., a group of SDS nodes within a given protection domain that are all powered in a same rack. By grouping SDS nodes into a given fault set, the system is configured to mirror the data for all storage devices in the given fault set, wherein mirroring is performed on SDS nodes that are outside the given fault set. A fault unit can be either a fault set or an SDS node that is not associated with a fault set. In some embodiments, user data is maintained in a RAID-1 mesh mirrored layout, where each piece of data is stored on two different fault units. The copies are distributed over the storage devices according to an algorithm that ensures uniform load of each fault unit in terms of capacity and expected network load.

Moreover, in some embodiments, a storage pool is a logical entity that defines a set of physical storage devices in a protection domain, wherein each storage device belongs to only one storage pool. When a volume is configured over the virtualization storage layer, the volume is distributed over all devices residing in the same storage pool. Each storage pool comprises a homogeneous set of storage devices (e.g., HDD storage pool, or SSD storage pool) to enable storage tiering. In some embodiments, each volume block has two copies located on two different fault units (e.g., two different SDS nodes), that allows the system to maintain data availability following a single-point failure.

The SDR 146 is a software component that is configured to implement a data replication system, e.g., journal-based asynchronous replication. In some embodiments, asynchronous replication is performed between two peer data storage systems, that are connected via a WAN. In general, asynchronous replication involves writing data to a source (primary) volume in a first data storage system, acknowledging completion of an I/O write operation to a host application before the data is replicated to a target (replica) volume in a second (remote) data storage system. With asynchronous replication, the I/O write operations at a source storage node are logged in a replication journal by a source SDR 146 on the source storage node, and the replication journal is periodically transmitted at scheduled times to a target storage node, wherein a target SDR 146 on the target storage node processes the received replication journal to replicate data to a target (replica) volume. The data replication system can be utilized for various purposes including, but not limited to, recovering from a physical or logical disaster, migrating data, testing data at a remote site, or offloading a data backup operation.

More specifically, in the exemplary embodiment of FIG. 1, the SDR 146 is responsible for processing all I/O requests associated with replicated volumes. In the source system, for replicated volumes, the SDCs 112 communicate with the SDR 146. For non-replicated volumes, the SDCs 112 communicate directly with the SDSs 142. At a source storage node, application I/O requests associated with a replicated volume are sent by an SDC 112 to a source SDR 146. The source SDR 146 will write the required journal data to a replication journal volume, and then send a duplicate of the replication I/O write request and associated user data to the SDS 142 wherein the SDS 142 performs write operations to write the received I/O user data in a primary volume. The journal data is then transmitted to a target SDR 146 on a target storage node, that processes the received replication journal to replicate data to the target (replica) volume. In some embodiments, a minimum of two SDRs are deployed on the source and target storage nodes to maintain high availability. If one SDR fails, the management layer (e.g., MDM nodes) directs the SDCs to send the I/O requests for replicated volumes to an available SDR 146.

The SDT 144 is a software component that is configured to provide support for NVMe-OF, in particular, NVMe over TCP (NVMe/TCP) that enables NVMe-oF across a standard Ethernet network. In some embodiments, the SDT 144 is configured in the storage layer to handle the I/O requests of the NVMe initiators 114 to provide support for the NVMe/TCP storage protocol for front end connectivity, and thus, allow the use of NVMe/TCP hosts in addition to the SDCs 112. In some embodiments, the SDT 144 is an NVMe target that is configured to translate control and I/O data path packets to the NVMe standard protocol, wherein each NVMe initiator 114 is serviced by multiple SDTs 144 depending on the supported number of paths in the NVMe multipathing driver. In essence, I/O requests are sent from a host NVMe initiator 114 (which is installed in the host operating system or hypervisor) to the SDT 144, and the SDT 144 communicates with a target SDS 142 to direct the I/O request to the target SDS 142.

As noted above, the environment monitoring server 180 can have an associated database 170 configured to store information related to a cluster environment topology 177 and a virtual infrastructure topology 178. Although the topology information is stored in the example of FIG. 1 in a single database 170, in other embodiments, an additional or alternative instance of the database 170, or portions thereof, may be employed.

The database 170 in the present embodiment is implemented using one or more storage systems. Such storage systems can comprise any of a variety of different types of storage including network-attached storage (NAS), storage area networks (SANs), direct-attached storage (DAS) and distributed DAS, as well as combinations of these and other storage types, including software-defined storage.

As shown in FIG. 1, the exemplary environment monitoring server 180 comprises a cluster monitoring and mitigation module 182, a virtual infrastructure monitoring and mitigation module 184, a journaling module 186 and a reporting module 188, as discussed further below. In one or more embodiments, the cluster monitoring and mitigation module 182 may use a REST API (representational state transfer API) and management credentials to monitor and configure the cluster computing environment 100. The virtual infrastructure monitoring and mitigation module 184 may use the cloud credentials for the virtual infrastructure and other cloud details listed in prerequisites in some embodiments for querying and modifying the storage nodes in the cloud by executing one or more operations on one or more public cloud APIs 190.

In the example of FIG. 1, the journaling module 186 may perform journaling (e.g., logging) of actions taken by the various modules 182, 184 according to predefined rules. The reporting module 188 notifies a designated list of addresses about changes to the storage system, for example, using electronic mail, a simple network management protocol or another designated method.

It is to be appreciated that this particular arrangement of modules 182, 184, 186, 188 illustrated in the environment monitoring server 180 of the FIG. 1 embodiment is presented by way of example only, and alternative arrangements can be used in other embodiments. For example, the functionality associated with modules 182, 184, 186, 188 in other embodiments can be combined into a single module, or separated across a larger number of modules. As another example, multiple distinct processors and/or memory elements can be used to implement different ones of modules 182, 184, 186, 188 or portions thereof. At least portions of modules 182, 184, 186, 188 may be implemented at least in part in the form of software that is stored in memory and executed by a processor. In some embodiments, the modules 182, 184, 186, 188 may be deployed, for example, on one or more storage nodes 132, using virtual infrastructure on the cloud and/or as a cloud service.

FIG. 1 shows an exemplary embodiment of a two-layer deployment in which the SDCs 112 (which consume storage) are deployed separately from the SDSs 142 (which contribute storage), e.g., the SDCs 112 are deployed on compute-only server nodes that host end-user applications, while the SDSs 142 are deployed on storage-only server nodes that contribute storage to the virtual SAN storage system.

In other embodiments, a converged infrastructure (e.g., hyperconverged infrastructure) can be implemented to provide a single-layer deployment in which, e.g., the SDCs 112 and the SDSs 142 are deployed on the same servers (each server node deploys a SDC 112 and an SDS 142) such that each server node is a data storage consumer (compute node) and a data storage supplier (storage provider node). In addition, for a single-layer deployment, the cluster-based MDMs 155 can be deployed on one or more server nodes that also host SDCs 112 and SDSs 142. In other embodiments, the system of FIG. 1 can be a hybrid system that is implemented with a combination of a single-layer and two-layer deployment.

FIG. 2 is a process diagram illustrating an exemplary implementation of a component malfunction mitigation process 200 in accordance with an illustrative embodiment. In the example of FIG. 2, a cluster monitor (e.g., the cluster monitoring and mitigation module 182) polls the cluster computing environment (e.g., cluster computing environment 100) for a health score (and/or monitors alerts or other notifications), if needed, and evaluates the obtained health score, for example, using one or more predefined policies, to identify a malfunctioning cluster component. In at least some embodiments, the health score provides a parameter indicating a degraded system state and the system notifications identify components having health issues. The cluster monitor also notifies a virtual infrastructure monitor (e.g., the virtual infrastructure monitoring and mitigation module 184) to provision a replacement virtual machine with specified properties.

In some embodiments, the cluster monitor then removes the malfunctioning component from the cluster computing environment 100 using a removal procedure designated for the malfunctioning component (e.g., an MDM, SDS, SDC, SDR and/or SDT, each having a designated secure removal procedure). For example, the cluster computing environment 100 may specify procedures for removing one or more of the MDM, SDS, SDC, SDR and/or SDT components. The virtual infrastructure monitor then identifies and releases the virtual machine where the malfunctioning storage component is executing.

The virtual infrastructure monitor selects a virtual machine type based on the component to be replaced and creates a new virtual machine according to the selected virtual machine type (and the region/availability zone of the replaced node). Network and security settings are applied to the new machine, according to the prerequisites for the virtual machine (such as open ports (e.g., firewall rules), a number of IP addresses for a node, routing rules and/or redundancy requirements). The virtual infrastructure monitor then deploys the storage component that requires replacement on the new virtual machine and informs the cluster monitor about the new virtual machine, and the credentials of the new virtual machine.

The cluster monitor then adds a new replacement storage component to the storage cluster and validates an operation of the replacement storage component (e.g., proper data/roles synchronization), retrying if needed.

If the replacement storage component cannot be added, the virtual infrastructure monitor performs a server (e.g., virtual machine) replacement to replace the server associated with the replacement storage component.

The journaling module records flow commands in a journal, and the reporting module is called to send notifications, if needed.

Figure 3:
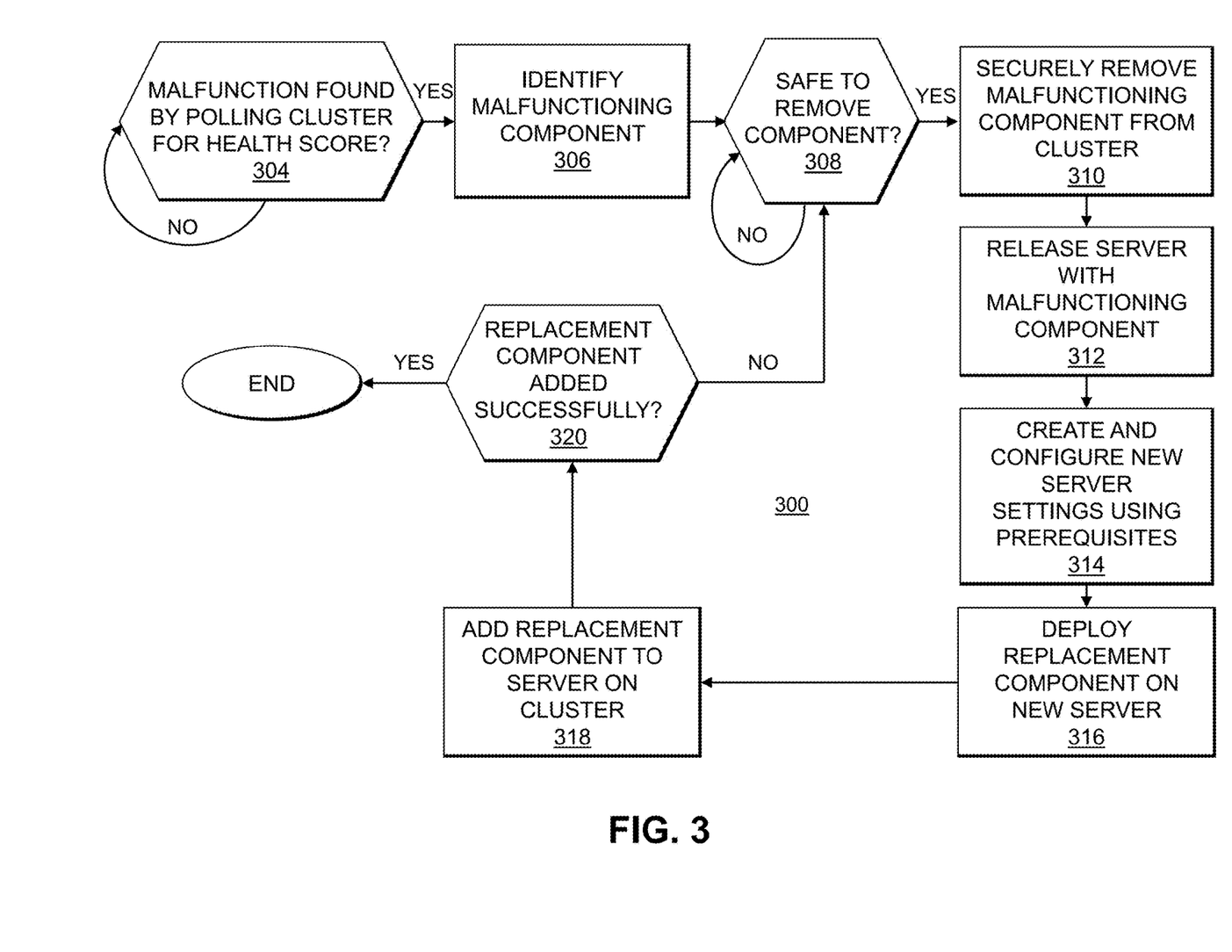
FIGS. 3 through 5 are flow diagrams illustrating exemplary implementations of methods for detection and mitigation of malfunctioning components in a cluster computing environment, according to one or more embodiments of the disclosure.

FIG. 3 is a flow diagram illustrating an exemplary implementation of a method 300 for detection and mitigation of malfunctioning components in a cluster computing environment, according to one or more embodiments of the disclosure. In the example of FIG. 3, a test is performed in step 304 to determine if the cluster monitor finds malfunction by polling the cluster for a health score. If it is determined in step 304 that the cluster monitor finds a malfunction, then the malfunctioning component (e.g., an SDS) is identified in step 306.

A further test is performed in step 308 to determine if it is safe to remove the identified malfunctioning component. Once it is determined in step 308 that it is safe to remove the identified malfunctioning component, then the malfunctioning component is safely removed from the cluster in step 310. The server (e.g., a virtual machine) comprising the malfunctioning component is released in step 312 and a new server is created and configured in step 314 using prerequisites for the new server. The replacement component is then deployed on the new server in step 316 and added to the server on a storage cluster in step 318.

A test is performed in step 320 to determine if the replacement component was added successfully. If it is determined in step 320 that the replacement component was added successfully, then program control ends. If, however, it is determined in step 320 that the replacement component was not added successfully, then program control proceeds to step 308.

Figure 4:
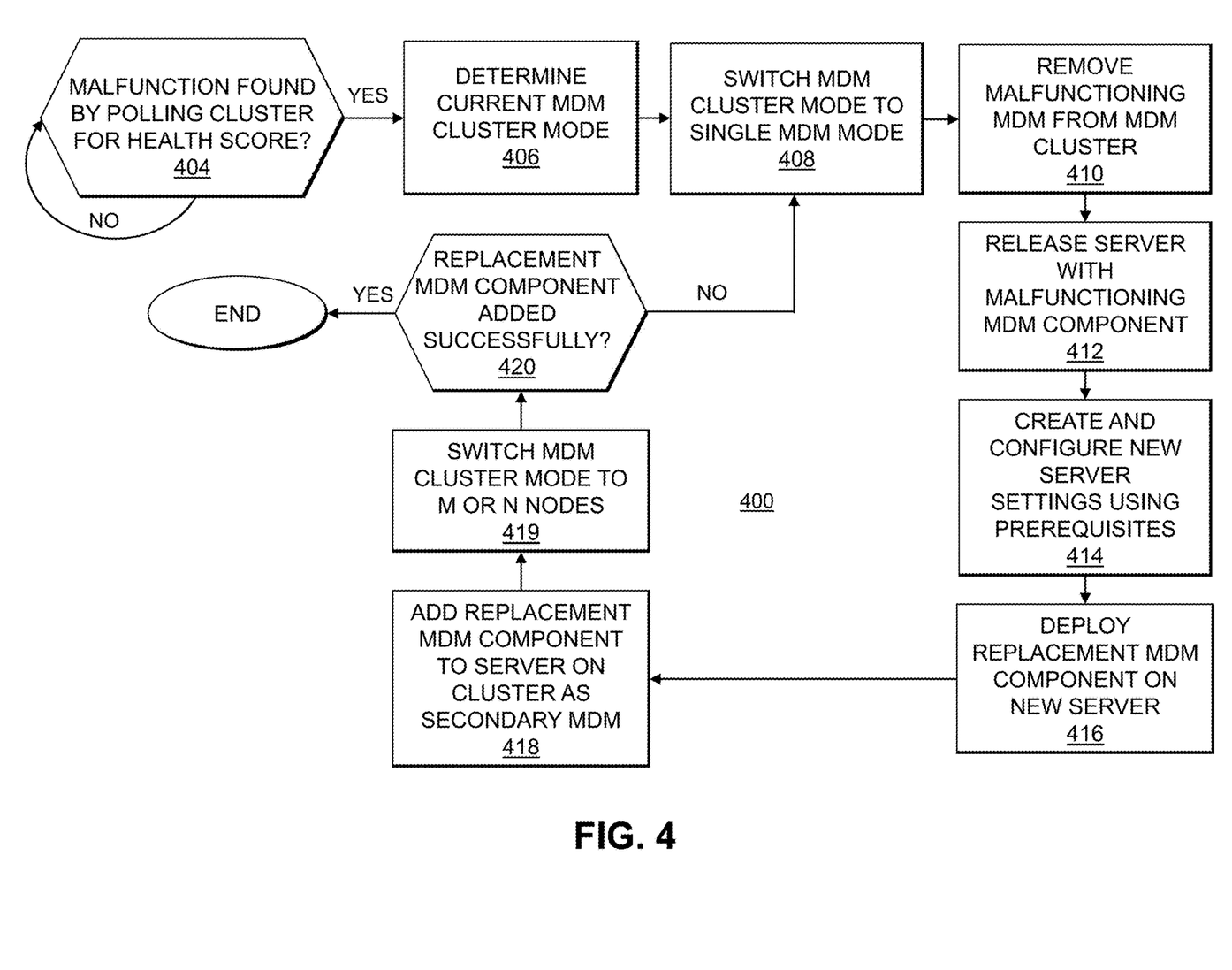

FIG. 4 is a flow diagram illustrating an exemplary implementation of a method 400 for detection and mitigation of malfunctioning components in a cluster computing environment, according to one or more embodiments of the disclosure. In the example of FIG. 4, a test is performed in step 404 to determine if the cluster monitor finds a malfunctioning component (e.g., an MDM) by polling the cluster for a health score. If it is determined in step 404 that the cluster monitor finds a malfunctioning component, then the current MDM cluster mode (e.g., a 3-node MDM cluster or a 5-node MDM cluster) is determined in step 406. The MDM cluster mode is switched to a single MDM mode in step 408.

The malfunctioning MDM component is removed from the MDM cluster in step 410. The server (e.g., a virtual machine) comprising the malfunctioning MDM component is released in step 412 and a new server is created and configured in step 414 using prerequisites for the new server. The replacement MDM component is then deployed on the new server in step 416 and added to the new server on a storage cluster in step 418 as a secondary MDM. The MDM cluster mode is switched back to M or N nodes (e.g., 3-node or 5-node) in step 419.

A test is performed in step 420 to determine if the replacement MDM component was added successfully. If it is determined in step 420 that the replacement component was added successfully, then program control ends. If, however, it is determined in step 420 that the replacement component was not added successfully, then program control proceeds to step 408.

Figure 5:
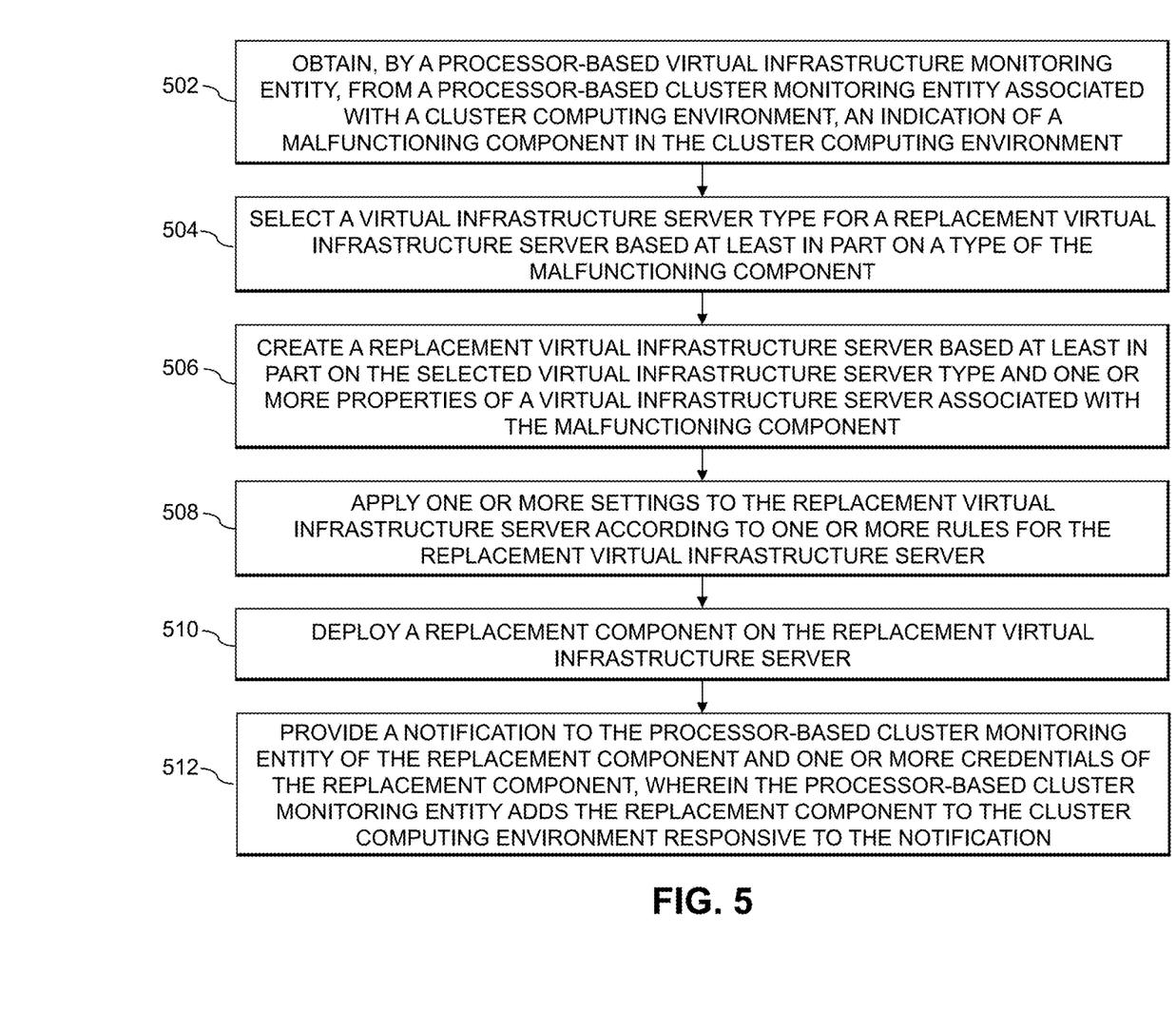

FIG. 5 is a flow diagram illustrating an exemplary implementation of a method for detection and mitigation of malfunctioning components in a cluster computing environment, according to one or more embodiments of the disclosure. In the example of FIG. 5, a processor-based virtual infrastructure monitoring entity obtains in step 502, from a processor-based cluster monitoring entity associated with a cluster computing environment, an indication of a malfunctioning component in the cluster computing environment.

In step 504, a virtual infrastructure server type is selected for a replacement virtual infrastructure server based at least in part on a type of the malfunctioning component. A replacement virtual infrastructure server is created in step 506 based at least in part on the selected virtual infrastructure server type and one or more properties of a virtual infrastructure server associated with the malfunctioning component.

One or more settings are applied to the replacement virtual infrastructure server in step 508 according to one or more rules for the replacement virtual infrastructure server. A replacement component is deployed on the replacement virtual infrastructure server in step 510. A notification is provided in step 512 to the processor-based cluster monitoring entity of the replacement component and one or more credentials of the replacement component, wherein the processor-based cluster monitoring entity adds the replacement component to the cluster computing environment responsive to the notification.

In one or more embodiments, the processor-based cluster monitoring entity may detect the malfunction associated with the malfunctioning component in the cluster computing environment by evaluating one or more of health scores and notifications for the cluster computing environment using a policy. The processor-based cluster monitoring entity may remove the malfunctioning component from a cluster using a removal procedure designated for the malfunctioning component. The processor-based cluster monitoring entity may reduce a size of the cluster comprising the malfunctioning component before performing the removing of the malfunctioning component from the cluster. The adding of the replacement component to the cluster computing environment by the processor-based cluster monitoring entity may comprise validating an operation of the replacement component and/or restoring, following the deployment of the replacement component, the cluster to an original size.

In some embodiments, the virtual infrastructure monitoring agent may release the virtual infrastructure server associated with the malfunctioning component. The virtual infrastructure monitoring agent may replace the replacement virtual infrastructure server in response to the replacement component not being added. In at least one embodiment, (i) information associated with one or more processing steps of the method may be recorded in a journal; and/or (ii) at least one notification may be generated based at least in part on information associated with one or more processing steps of the method in a journal. The creating the replacement virtual infrastructure server may employ topology information related to one or more of the cluster computing environment and a virtual infrastructure environment.

The particular processing operations and other network functionality described in conjunction with the flow diagrams of FIGS. 3 through 5 are presented by way of illustrative example only and should not be construed as limiting the scope of the disclosure in any way. Alternative embodiments can use other types of processing operations for detection and mitigation of malfunctioning components in a cluster computing environment. For example, the ordering of the process steps may be varied in other embodiments, or certain steps may be performed concurrently with one another rather than serially. In one aspect, the process can skip one or more of the actions. In other aspects, one or more of the actions are performed simultaneously. The processing of one or more of the actions can also be distributed between multiple components. In some aspects, additional actions can be performed.

While one or more embodiments have been described herein using a virtual machine implementation, the disclosed malfunction mitigation techniques can also be applied for solutions running on containerized platforms (such as Kubernetes). For further reliability, the self-healing system can run in redundant (e.g., multiple) copies. Prerequisites may be kept outside of the cluster nodes and the cluster nodes can remain stateless. A modular design of the self-healing system, with the prerequisites, cluster monitor and virtual infrastructure monitor in separate modules may be helpful in some embodiments for adopting the same solution (e.g., code base) for different cloud platforms and storage platforms. The prerequisites and commands/command blocks for the cluster monitor and virtual infrastructure monitor can be editable in some embodiments to adapt for other cluster types.

In some embodiments, techniques are provided for detection and mitigation of malfunctioning components in a cluster computing environment. In at least some embodiments, the disclosed malfunction mitigation techniques provide a holistic infrastructure management system that uses domain knowledge of the storage system (software stack).

Among other benefits, the disclosed cluster component malfunction mitigation techniques automatically refresh cluster nodes. In addition, the need for human interaction is significantly reduced and the system degradation/downtime is also significantly reduced (e.g., when there are cloud-issues that need to be resolved, and other issues caused by internal software issues in the storage system, such as malfunctioning components requiring automatic replacement). Further, the disclosed malfunction mitigation techniques enable an improved cloud resources utilization, saving a customer from paying for cloud instances running malfunctioning storage components.

One or more embodiments of the disclosure provide improved methods, apparatus and computer program products for detection and mitigation of malfunctioning components in a cluster computing environment. The foregoing applications and associated embodiments should be considered as illustrative only, and numerous other embodiments can be configured using the techniques disclosed herein, in a wide variety of different applications.

It should also be understood that the disclosed cluster component malfunction mitigation techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for detection and mitigation of malfunctioning components in a cluster computing environment may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based cluster component malfunction mitigation engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based cluster component malfunction mitigation platform in illustrative embodiments. The cloud-based systems can include block storage such as Amazon EBS (Elastic Block Store), GCP Persistent Disk, and Microsoft Azure Managed Disks.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. These platforms may also be used to implement at least portions of other information processing systems in other embodiments.

Figure 6:
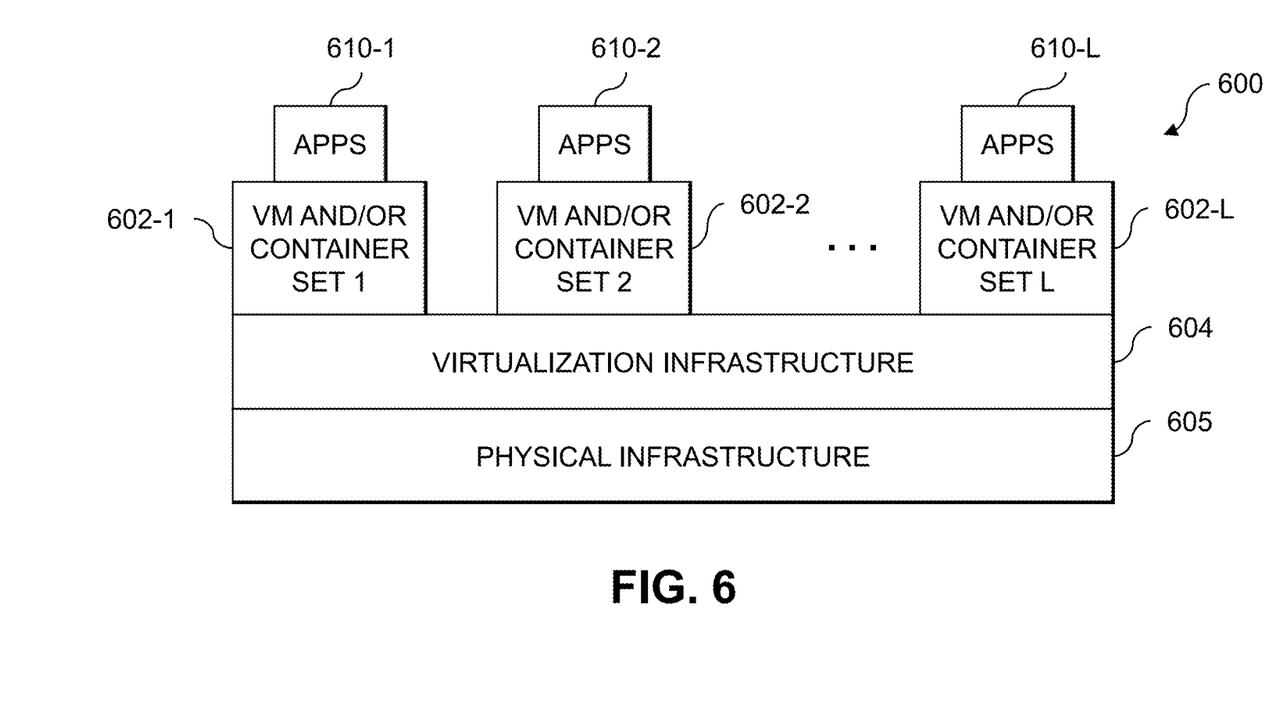
FIG. 6 illustrates an exemplary processing platform that may be used to implement at least a portion of one or more embodiments of the disclosure comprising a cloud infrastructure.

FIG. 6 shows an example processing platform comprising cloud infrastructure 600. The cloud infrastructure 600 comprises a combination of physical and virtual processing resources that may be utilized to implement at least a portion of an information processing system. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide cluster component malfunction mitigation functionality of the type described above for one or more processes running on a given one of the VMs. For example, each of the VMs can implement cluster component malfunction detection control logic and associated functionality for mitigation of such component malfunctions for one or more processes running on that particular VM.

An example of a hypervisor platform that may be used to implement a hypervisor within the virtualization infrastructure 604 is a compute virtualization platform which may have an associated virtual infrastructure management system such as server management software. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can provide cluster component malfunction mitigation functionality of the type described above for one or more processes running on different ones of the containers. For example, a container host device supporting multiple containers of one or more container sets can implement one or more instances of cluster component malfunction detection control logic and associated functionality for mitigating such component malfunctions.

As is apparent from the above, one or more of the processing modules or other components of the information processing system may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises at least a portion of the given system and includes a plurality of processing devices, denoted 702-1, 702-2, 702-3, ... 702-K, which communicate with one another over a network 704. The network 704 may comprise any type of network, such as a WAN, a LAN, a satellite network, a telephone or cable network, a cellular network, a wireless network such as WiFi or WiMAX, or various portions or combinations of these and other types of networks.

The processing device 702-1 in the processing platform 700 comprises a processor 710 coupled to a memory 712. The processor 710 may comprise a microprocessor, a microcontroller, an application specific integrated circuit (ASIC), a field programmable gate array (FPGA) or other type of processing circuitry, as well as portions or combinations of such circuitry elements, and the memory 712, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and the given system may include additional or alternative processing platforms, as well as numerous distinct processing platforms in any combination, with each such platform comprising one or more computers, storage devices or other processing devices.

Figure 7:
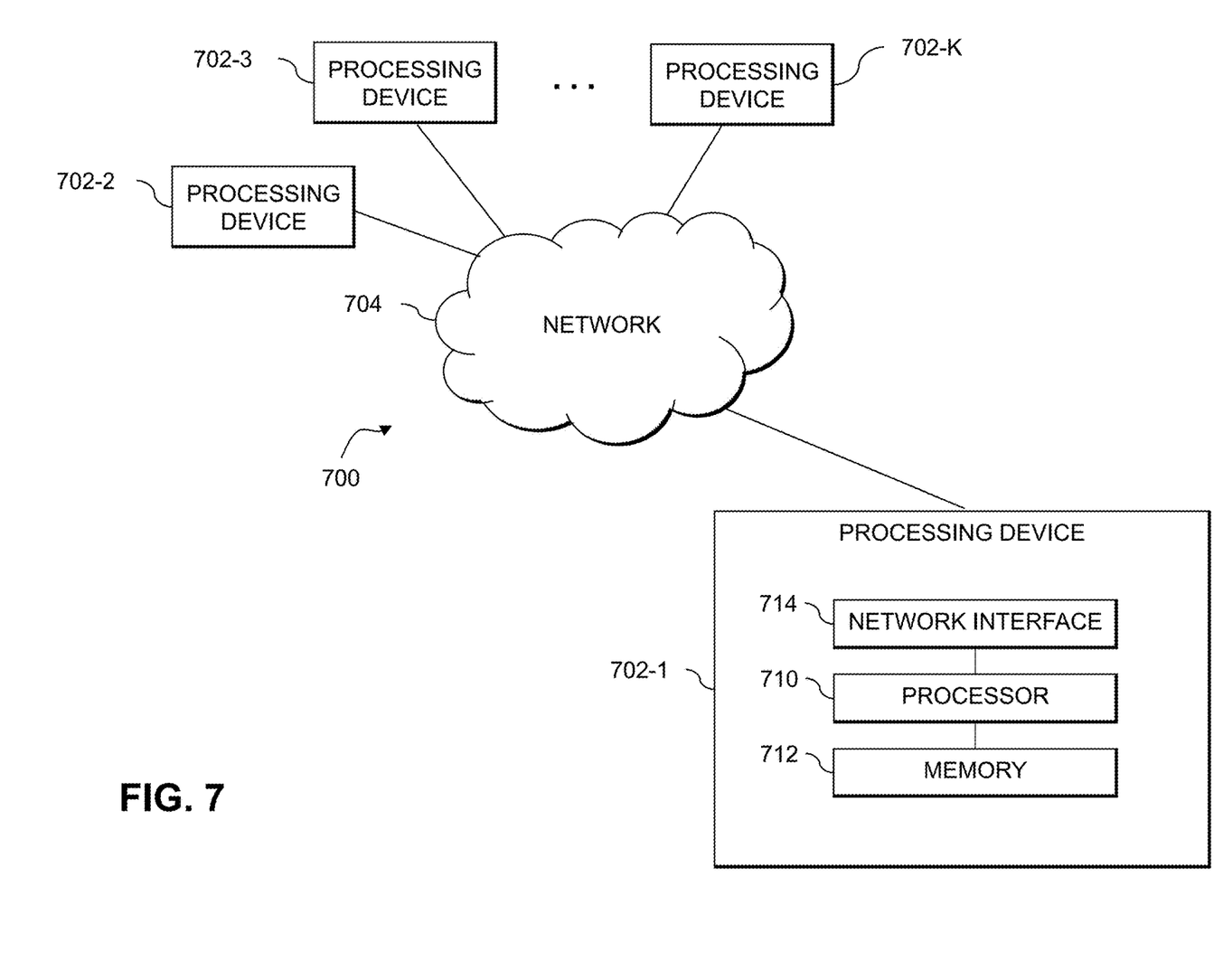
FIG. 7 illustrates another exemplary processing platform that may be used to implement at least a portion of one or more embodiments of the disclosure.

Multiple elements of an information processing system may be collectively implemented on a common processing platform of the type shown in FIG. 6 or 7, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell Technologies.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only.

Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
    obtaining, by a processor-based virtual infrastructure monitoring entity, from a processor-based cluster monitoring entity associated with a cluster computing environment, an indication of a malfunctioning component in the cluster computing environment;
    selecting, by the processor-based virtual infrastructure monitoring entity, a virtual infrastructure server type for a replacement virtual infrastructure server based at least in part on a type of the malfunctioning component;
    creating, by the processor-based virtual infrastructure monitoring entity, a replacement virtual infrastructure server based at least in part on the selected virtual infrastructure server type and one or more properties of a virtual infrastructure server associated with the malfunctioning component;
    applying, by the processor-based virtual infrastructure monitoring entity, one or more settings to the replacement virtual infrastructure server according to one or more rules for the replacement virtual infrastructure server;
    deploying, by the processor-based virtual infrastructure monitoring entity, a replacement component on the replacement virtual infrastructure server; and
    providing, by the processor-based virtual infrastructure monitoring entity, a notification to the processor-based cluster monitoring entity of the replacement component and one or more credentials of the replacement component, wherein the processor-based cluster monitoring entity adds the replacement component to the cluster computing environment responsive to the notification;
    wherein the method is performed by at least one processing device comprising a processor coupled to a memory.

2. The method of claim 1, wherein the processor-based cluster monitoring entity detects the malfunction associated with the malfunctioning component in the cluster computing environment by evaluating one or more of health scores and notifications for the cluster computing environment using a policy.

3. The method of claim 1, further comprising the processor-based cluster monitoring entity removing the malfunctioning component from a cluster using a removal procedure designated for the malfunctioning component.

4. The method of claim 3, wherein the processor-based cluster monitoring entity reduces a size of the cluster comprising the malfunctioning component before performing the removing of the malfunctioning component from the cluster.

5. The method of claim 4, wherein the processor-based cluster monitoring entity adds the replacement component to the cluster computing environment by validating an operation of the replacement component and restoring, following the deployment of the replacement component, the cluster to an original size.

6. The method of claim 1, further comprising the processor-based virtual infrastructure monitoring entity releasing the virtual infrastructure server associated with the malfunctioning component.

7. The method of claim 1, further comprising the processor-based virtual infrastructure monitoring entity replacing the replacement virtual infrastructure server in response to the replacement component not being added.

8. The method of claim 1, further comprising one or more of: (i) recording information associated with one or more processing steps of the method in a journal; and (ii) generating at least one notification based at least in part on information associated with one or more processing steps of the method in a journal.

9. The method of claim 1, wherein the creating the replacement virtual infrastructure server employs topology information related to one or more of the cluster computing environment and a virtual infrastructure environment.

10. An apparatus comprising:
    at least one processing device comprising a processor coupled to a memory;
    the at least one processing device being configured to implement the following steps:
    obtaining, by a processor-based virtual infrastructure monitoring entity, from a processor-based cluster monitoring entity associated with a cluster computing environment, an indication of a malfunctioning component in the cluster computing environment;
    selecting, by the processor-based virtual infrastructure monitoring entity, a virtual infrastructure server type for a replacement virtual infrastructure server based at least in part on a type of the malfunctioning component;
    creating, by the processor-based virtual infrastructure monitoring entity, a replacement virtual infrastructure server based at least in part on the selected virtual infrastructure server type and one or more properties of a virtual infrastructure server associated with the malfunctioning component;
    applying, by the processor-based virtual infrastructure monitoring entity, one or more settings to the replacement virtual infrastructure server according to one or more rules for the replacement virtual infrastructure server;
    deploying, by the processor-based virtual infrastructure monitoring entity, a replacement component on the replacement virtual infrastructure server; and
    providing, by the processor-based virtual infrastructure monitoring entity, a notification to the processor-based cluster monitoring entity of the replacement component and one or more credentials of the replacement component, wherein the processor-based cluster monitoring entity adds the replacement component to the cluster computing environment responsive to the notification.

11. The apparatus of claim 10, wherein the processor-based cluster monitoring entity detects the malfunction associated with the malfunctioning component in the cluster computing environment by evaluating one or more of health scores and notifications for the cluster computing environment using a policy.

12. The apparatus of claim 10, further comprising the processor-based cluster monitoring entity removing the malfunctioning component from a cluster using a removal procedure designated for the malfunctioning component.

13. The apparatus of claim 12, wherein the processor-based cluster monitoring entity reduces a size of the cluster comprising the malfunctioning component before performing the removing of the malfunctioning component from the cluster, and adds the replacement component to the cluster computing environment by: validating an operation of the replacement component and restoring, following the deployment of the replacement component, the cluster to an original size.

14. The apparatus of claim 10, further comprising the processor-based virtual infrastructure monitoring entity releasing the virtual infrastructure server associated with the malfunctioning component.

15. The apparatus of claim 10, further comprising the processor-based virtual infrastructure monitoring entity replacing the replacement virtual infrastructure server in response to the replacement component not being added.

16. A non-transitory processor-readable storage medium having stored therein program code of one or more software programs, wherein the program code when executed by at least one processing device causes the at least one processing device to perform the following steps:

obtaining, by a processor-based virtual infrastructure monitoring entity, from a processor-based cluster monitoring entity associated with a cluster computing environment, an indication of a malfunctioning component in the cluster computing environment;

selecting, by the processor-based virtual infrastructure monitoring entity, a virtual infrastructure server type for a replacement virtual infrastructure server based at least in part on a type of the malfunctioning component;

creating, by the processor-based virtual infrastructure monitoring entity, a replacement virtual infrastructure server based at least in part on the selected virtual infrastructure server type and one or more properties of a virtual infrastructure server associated with the malfunctioning component;

applying, by the processor-based virtual infrastructure monitoring entity, one or more settings to the replacement virtual infrastructure server according to one or more rules for the replacement virtual infrastructure server;

deploying, by the processor-based virtual infrastructure monitoring entity, a replacement component on the replacement virtual infrastructure server; and providing, by the processor-based virtual infrastructure monitoring entity, a notification to the processor-based cluster monitoring entity of the replacement component and one or more credentials of the replacement component, wherein the processor-based cluster monitoring entity adds the replacement component to the cluster computing environment responsive to the notification.

17. The non-transitory processor-readable storage medium of claim 16, wherein the processor-based cluster monitoring entity detects the malfunction associated with the malfunctioning component in the cluster computing environment by evaluating one or more of health scores and notifications for the cluster computing environment using a policy.

18. The non-transitory processor-readable storage medium of claim 16, further comprising the processor-based cluster monitoring entity removing the malfunctioning component from a cluster using a removal procedure designated for the malfunctioning component.

19. The non-transitory processor-readable storage medium of claim 16, further comprising the processor-based virtual infrastructure monitoring entity releasing the virtual infrastructure server associated with the malfunctioning component.

20. The non-transitory processor-readable storage medium of claim 16, further comprising the processor-based virtual infrastructure monitoring entity replacing the replacement virtual infrastructure server in response to the replacement component not being added.

* * * * *